United States Patent
Long et al.

(10) Patent No.: US 6,966,753 B2
(45) Date of Patent: Nov. 22, 2005

(54) SOLE PLATE FOR TURBINE AND POWER GENERATING PLANT EQUIPMENT

(75) Inventors: Than Trong Long, Yokohama (JP);
Atsushi Kimoto, Yokohama (JP);
Yomei Yoshioka, Yokohama (JP);
Toshihiro Fujiwara, Yokohama (JP);
Osamu Watanabe, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/478,323

(22) PCT Filed: May 21, 2002

(86) PCT No.: PCT/JP02/04874

§ 371 (c)(1),
(2), (4) Date: Nov. 20, 2003

(87) PCT Pub. No.: WO03/006800

PCT Pub. Date: Jan. 23, 2003

(65) Prior Publication Data

US 2004/0144078 A1 Jul. 29, 2004

(30) Foreign Application Priority Data

May 21, 2001 (JP) ............................. 2001-151651

(51) Int. Cl.[7] ............................................. F01D 25/28
(52) U.S. Cl. ................................................. 415/213.1
(58) Field of Search ........................... 415/213.1, 229; 416/244 R; 384/42, 129

(56) References Cited

U.S. PATENT DOCUMENTS

| 4,238,137 A |  | 12/1980 | Furchak et al. |  |
|---|---|---|---|---|
| 4,623,590 A | * | 11/1986 | Hodes et al. | ............... 428/408 |
| 4,653,277 A | * | 3/1987 | Bozec | ............ 60/692 |
| 4,732,818 A |  | 3/1988 | Pratt et al. |  |
| 5,162,157 A | * | 11/1992 | Tanaka et al. | ............... 428/549 |
| 5,300,366 A |  | 4/1994 | Nakamaru et al. |  |
| 6,416,846 B2 |  | 7/2002 | Long |  |
| 6,712,516 B1 | * | 3/2004 | Giberson | ............... 384/215 |

FOREIGN PATENT DOCUMENTS

| JP | 62-165515 | 7/1987 |
|---|---|---|
| JP | 2000-205277 | 7/2000 |

* cited by examiner

Primary Examiner—Ninh H. Nguyen
(74) Attorney, Agent, or Firm—Finnegan, Henderson, Farabow, Garrett & Dunner, L.L.P.

(57) ABSTRACT

A sole plate in use for turbine capable of realizing a smooth sliding on a gland pad used in the mounting portion of power generating plant equipment, effectively suppressing a variation in the alignment of a rotating shaft by a reaction due to thermal expansion and the thrust of a gas turbine, and eliminating a regular maintenance such as filing of lubricating oil, and disposed between the gland pad installed on a base and a turbine support part, comprising a sole plate body made of a metal material disposed on the turbine support part sole and a sliding member made of a material with self-lubricity formed on the surface of the sole plate body on the gland pad side.

12 Claims, 6 Drawing Sheets

SOLE PLATE FOR TURBINE AND POWER GENERATING PLANT EQUIPMENT

TECHNICAL FIELD

The present invention relates to a sole plate in use for installing a steam turbine and the like on a turbine base, and a power generating plant equipment using this sole plate.

BACKGROUND ART

The conventional steam turbine in use for a big volume generating power plant can be generally divided into three sections that is a high pressure turbine section, medium pressure turbine section and low pressure turbine section in order to cope with the expansion of steam, temperature change and volume change. Therefore, there are arranged a high pressure turbine, a medium pressure turbine, and a low pressure turbine, in order of pressure and temperature.

Further, in term of saving energy and resource, and harmonization of global environment, a gas turbine engine and a steam turbine engine are combined to reduce the waste amount of carbon dioxide and then, a combined cycle power generation is carried out.

The prior art one-shaft combined cycle power plant is good at its performance and operation capability, and therefore, recently its gas turbine has become in a big scale and big volume and the steam turbine has become operating at high temperature, and recycling the heat, and having a big volume.

Figure 1:
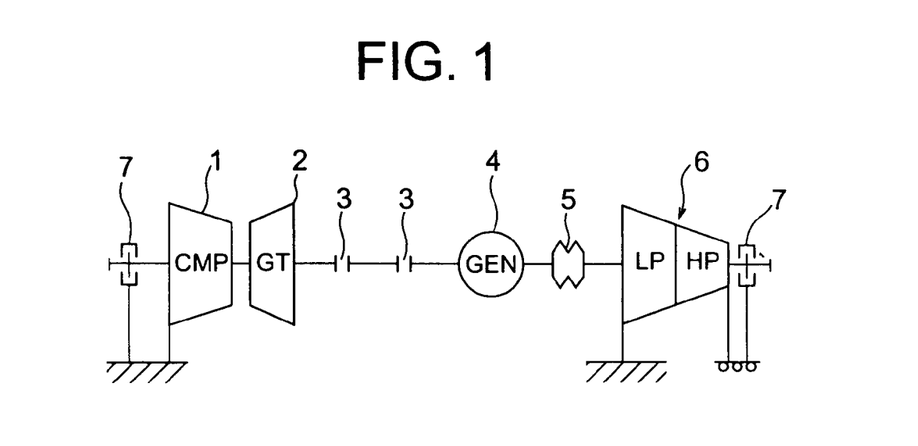
FIG. 1 is a view illustrating schematically the shaft structure of the prior art one-shaft combined cycle plant.

FIG. 1 illustrates one example of a shaft structure of the prior art one-shaft combined cycle power plant having relatively low volume, and with non-recycling of heat and low steam temperature. A gas turbine 2 directly connected to a compressor 1 is connected to a shaft of a generator 4 by means of a rigid coupling mechanism. The shaft of the generator 4 is connected to a steam turbine 6 by means of a diaphragm coupling mechanism 5 too. Further, a thrust bearing 7 is provided at the outside of the compressor 1 and the steam turbine 6.

However, in the above mentioned conventional plants, an expansion of the shaft along its axis can be absorbed by the diaphragm coupling mechanism, and therefore, this enables to have a thrust bearing respectively on each of a gas turbine and a steam turbine, and then, the gas turbine and the steam turbine do not affect each to the other and they are independent each to the other to enable independent designing of those turbine. Then, because the steam turbine has relatively low volume, it can be in a small size, and further, because a low pressure steam turbine can be operated at low centrifugal force of turbine blade, and at low temperature of its main steam, a rotor of the steam turbine can be the same one rotor made from the same properties.

Figure 2:
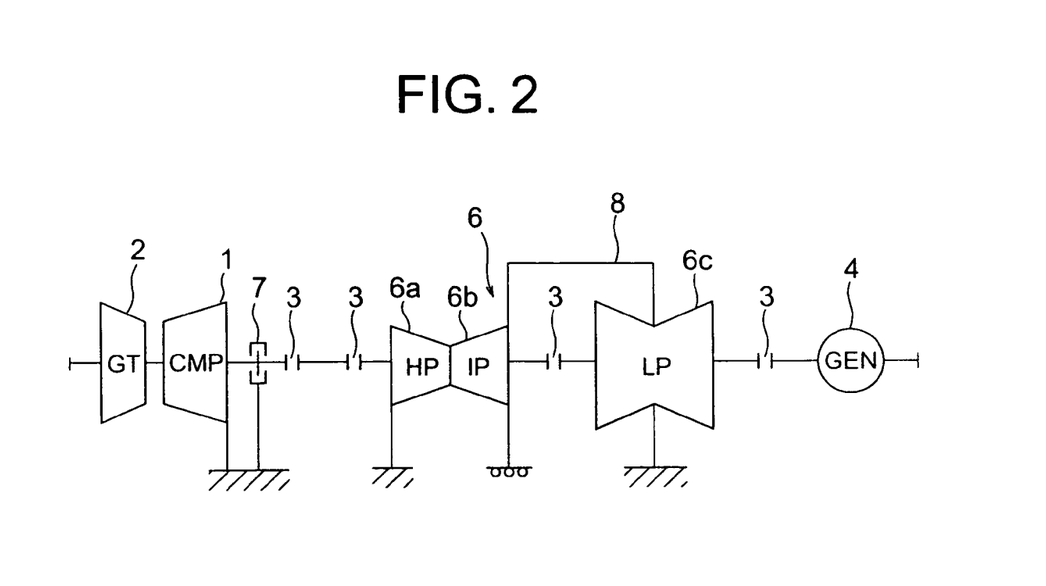
FIG. 2 is a view illustrating schematically another shaft structure of the prior art big volume one-shaft combined cycle plant.

On the other hand, in order to improve energy efficiency of the combined cycle plant, the gas turbine and the steam turbine should be scaled up to have a big volume, to make the steam recycled and re-heated and to be at the higher temperature. Therefore, there has been proposed a big volume one-shaft combined cycle power plan as shown in FIG. 2 illustrating its shaft structure.

In the other words, the diaphragm coupling mechanism 5 as used in the plant of FIG. 1 has become much scaled-up at its transmission volume, thereby to cause many problems such as noise and wind loss. Therefore, such big volume one-shaft combined cycle power plan should be as shown in FIG. 2 in which the gas turbine and the steam turbine and the generator are connected with a rigid coupling mechanism 3.

Therefore, the thermal expansion of the shaft can not be absorbed within such structure, a thrust bearing 7 is provided only at one position of the shaft of the compressor 1 for the gas turbine. Therefore, in order to minimize the difference in the thermal expansion occurred in the non-moving portion and the rotating portion of the steam turbine, the steam turbine 6 should be positioned between the compressor 1 of the gas turbine near to the thrust bearing 7, and the generator 4.

Further, a steam turbine 6 is divided into a high pressure turbine 6a, a medium pressure turbine 6b and a low pressure turbine 6d, and the exhaust from the medium pressure turbine 6b is connected through a tube connector 8.

Figure 3:
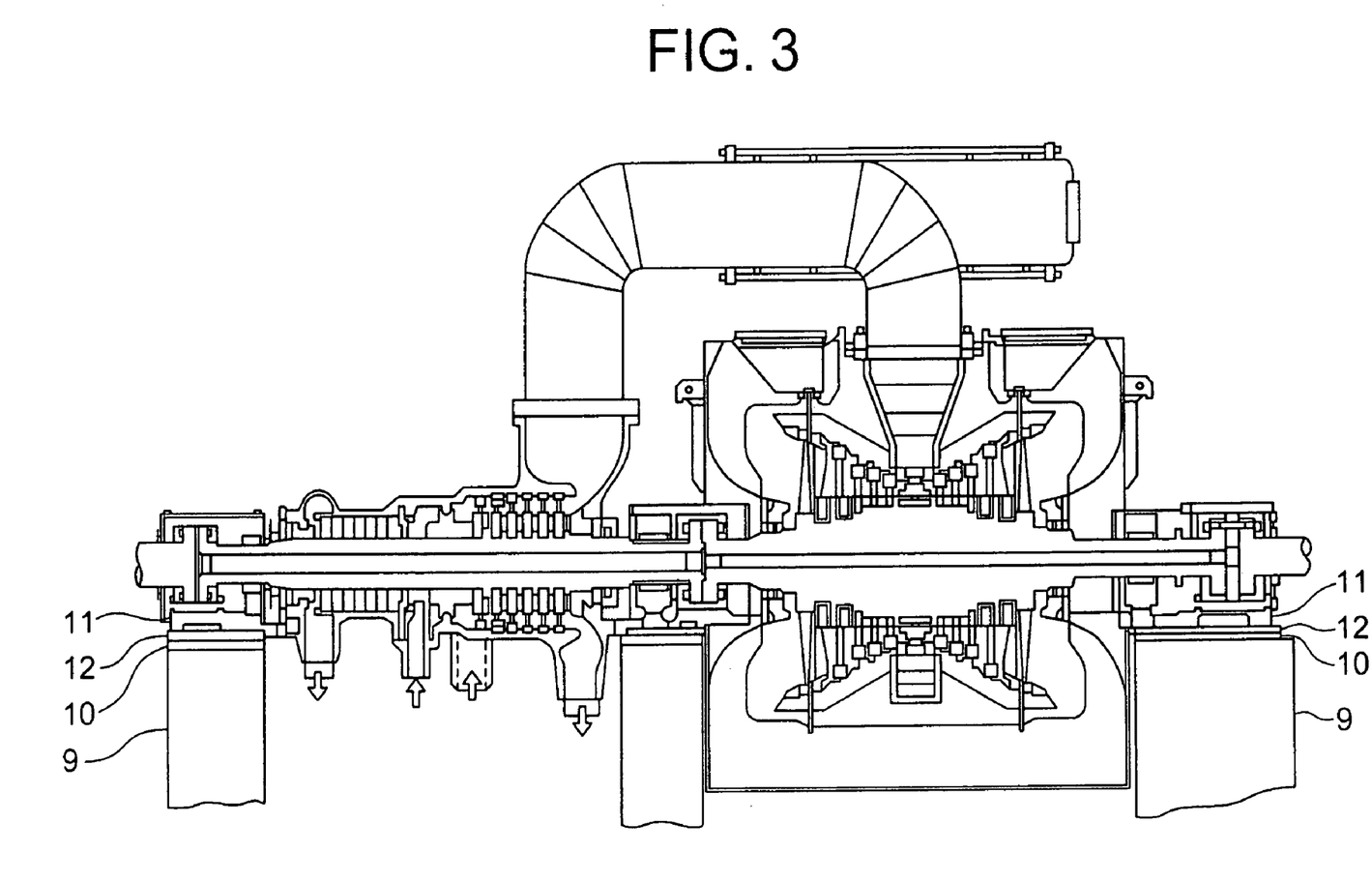
FIG. 3 is a view illustrating schematically in section the prior art steam turbine.

FIG. 3 illustrates a sectional view of one example of a steam turbine in use for a big volume one-shaft combined cycle power plant. On this drawing, a connection to the gas turbine side is shown on the right side of the drawing, that is, the high pressure turbine side.

As shown, the gas turbine and the steam turbine are fixed on a base concrete block by means of a gland pas and a sole plate. For example, in the steam turbine 6 as shown in FIG. 3, a gland pad 10 is fixed on a base 9 comprising a concrete block, and a bearing base 11 of the steam turbine and a sole plate 12 fixed are positioned on the gland pad 10.

The gland pad 10 and the sole plate 12 are provided to slide each to the other, and then such structure enables to control or suppress the change of the alignment of the shaft due to the reaction against the thermal expansion and the thrust of the gas turbine, and to control the vibration and noise.

However, in view of saving energy, and economy, the gas turbine and the steam turbine have been advanced to have a bigger volume, and further, the steam turbine to use the recycled heat, and the higher temperature. Therefore, the length and weight of the shaft have been raised, and the weight of the sole plate supporting each of the turbines has been raised. When the shaft has to rotate at very high speed, the alignment of the shaft would be changed to generate intense vibration and noise.

Particularly on the one-shaft combined cycle power plant, a compressor, a gas turbine, a generator, a turbine are connected on one shaft by a rigid coupling mechanism, and further, such rotating shaft is long so that there would be occurred severe vibration and noise even if only small shift of the alignment is found. In the bigger volume one-shaft combined cycle power plant, more severe vibration and noise would be occurred.

In the prior art, oil grooves are provided on the surface of the sole plate for a lubricant oil so as to enhance the sliding between the gland pad and the sole plate, thereby reducing the load applied to the sole plate.

However, the further reduction of load to the sole plate to make more smooth sliding is expected and requested to a bigger volume one-shaft combined cycle power plant in which the change of the alignment will affect more.

Further, when a grease lubricant is used at higher temperature for some time, it would be solidified to lose its lubricating properties, and further the smooth sliding of the sole plate can not be kept for long time, and then, new lubricant must be replaced in place of old lubricant as solidified at a predetermined interval. Then, the labor and cost for such maintenance of the plant have been needed.

DISCLOSURE OF THE INVENTION

It is an object of the present invention to provide a sole plate with reduced cost of maintenance and in certain case eliminating a periodic maintenance such as adding a lubricant, by attaining smooth sliding on the gland pad, and effectively suppressing the reaction against the heat expansion and the change in the alignment of the shaft structure due to the thrust of a gas turbine, and further controlling the generation of vibration and noise.

The sole plate in use for turbine in accordance with the present invention comprises a gland pad mounted on a base, and a sole plate provided in a space to the base of the turbine, wherein the sole plate body comprises metal material positioned on the side of the base of the turbine, and further a self-lubricity material formed on the surface of the gland pad of the sole plate body.

Further, it is an another object of the present to provide a power generating plant equipment using the above mentioned sole plate in use for a turbine with good sliding property, for a sole plate in use for supporting the turbine on the base.

The power plant equipment of the present invention comprises a gland pad mounted on the base, and a turbine positioned on the gland pad by means of the sole plant, and is characterized by the sole plate as claimed.

MODE FOR IMPLEMENTING THE INVENTION (Sole Plate in Use for Turbine)

Figure 4:
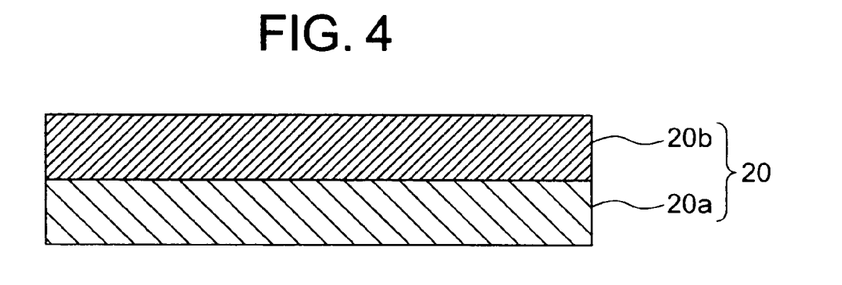
FIG. 4 shows a sectional view of the sole plate in use for turbine in accordance of the present invention.

FIG. 4 illustrates a sole plate 20 in use for a turbine. The sole plate comprises a sole plate body 20a and a sliding member 20b as an essential member.

A sole plate body 20a comprises metal material having given strength, the properties of which is not restricted essentially. Therefore, the conventional metal sole plate which has been used can be used, e.g. the steel such as AISI (American Iron and Steel Institute) 1045 and AISI 4130 can be used for the material of the sole plate body of the present invention.

A sliding member 20b comprises a material with self-lubricity and the material composing the sliding member 20b may be a self-lubricity organic material or inorganic material or the combined material with self-lubricity.

Hereinafter, the "self-lubricity material" or "material with self-lubricity" shall have low friction coefficient and anti-friction. The reason of using "self-lubricity material" for a material of the sliding member 20b is based on the fact that the sole plate is positioned on a gland pad fixed on a base, should be smoothly sliding on the gland pad during operation.

The self-lubricity material is applied to the side of the sole plate facing and contacting to the gland pad so as to form a smooth sliding between the sole plate and the gland pad.

Further, by applying such self-lubricity material, the necessity of inserting a lubricant between a sole plate and a gland pad can be removed so as to reduce much the cost of maintenance.

The self-lubricity material to be applied has preferably less than 0.30 of the friction coefficient between the sliding member and the gland pad. This will enable to make smooth sliding between the sole plate and the gland pad, further to control effectively and much the change of the alignment of a shaft due to the reaction against the thermal expansion of the shaft and the thrust of the gas turbine, and thereby minimizing a vibration and noise generation. The friction coefficient may be more preferably less than 0.20.

There may be listed for inorganic material with self-lubricity to be applied on the sliding member a metal material or ceramic material. There may be as a metal material, e.g. copper or copper alloy. Further, there may be as a ceramic material carbon, graphite, $MoS_2$, BN, SiC, TiC, AlN and TiN. Those materials can be used solely or in the combination.

The organic material with self-lubricity may be a resin material with self-lubricity. There may be listed for resin material with self-lubricity to be applied on the sliding member for example, ethylene tetrafluoride, ethylene tetrafluoride perfluoro alkoxy ethylene, polyether ether ketone and polyimido having low friction coefficient. Those materials can be used solely or in the combination.

The compression elasticity modulus (E) of the material with self-lubricity is preferably more than 500 MPa. By using the material having the compression elasticity modulus (E) more than 500 MPa, the deformation due to the weight of the gas turbine and the steam turbine can be controlled and further, the shift in the alignment of the shaft and the generation of vibration and noise can be reduced.

The self-lubricity material forming the sliding member may be sole material with the self-lubricity, or the self-lubricity material reinforced with reinforcing material (composite). The reinforcing material may be glass fibers, carbon fibers, graphite fibers or ceramic fibers or the particulate material thereof.

When the fibrous reinforcing material is used, the average diameter of the fibers is preferably 0.05 μm to 100 μm. If the average diameter is less than 0.05 μm, the yield or efficiency in a manufacture process would be lowered, and the cost of the material would raise. If the average diameter is more than 100 μm, the dispersion state would not be good. The average diameter is preferably 0.1 μm to 50 μm and more preferably 1 μm to 10 μm. The aspect ratio of the fibrous reinforcing material is preferably 10 to 100. The length of the fibers of the material is preferably 10 μm to 100 μm.

The content of the reinforcing material is preferably 5 to 50 wt % and can be changed depending on its requirement. If the content is less than 5 wt %, the effect of reinforcing is not enough. If the content is more than 50 wt %, the effect of reinforcing can not be expected, and further, it would be difficult to manufacture such composite material. The content of the reinforcing filler material ranges preferably 5 to 30 wt %, and further more preferably 10 to 20 wt %.

A sliding member comprises a sole plate and a sliding material, in which the compression elastic deformation ($\Delta t$) of said material with self-lubricity is preferably less than 0.1 mm, wherein the sole plate is loaded on it surface at the pressure($\sigma$) and the material with self-lubricity d pressure has a compression elastic modulus (E), and the sliding material has a thickness (t).

In the other words, the compression elastic deformation ($\Delta t$) of said material with self-lubricity should be less than 0.1, in consideration of the loaded pressure ($\sigma$) of the sole plate, the compression elastic modulus (E) of the material with self-lubricity, wherein $$\Delta t = \epsilon \times t$$

$$\epsilon = \sigma/E$$

wherein $\Delta t$: compression elastic deformation (mm);
t: thickness of the sliding member (mm);
$\epsilon$: strain;
$\sigma$: loaded pressure (MPa);
E: compression elastic modulus (MPa) of said material with self-lubricity.

There should be noted that the thickness (t) of the material with self-lubricity shall be an essential thickness of the sole plate body which excludes the thickness or depth of the grooves as formed on its surface and the thickness of the self-lubricity porous layer and such self-lubricity material when such grooves and the self-lubricity layer and material are formed on its surface.

The sole plate body and the sliding material can be joined by means of chemical binding or mechanical binding or some media layer. The chemical binding may be carried out by binding by an adhesive, e.g. a sole plate body and a sliding member are separately manufactured and integrated by means of an adhesive.

The other method of preparing the sliding member may include a coating, covering, compression moulding or injection moulding of the self-lubricity material on the surface of the sole plate body, and further, a cold layered-moulding, and heated melt layering on the surface, or further, the self-lubricity material can be applied on the surface of the sole plate body, and a lining technology, compression moulding, and injection moulding can be used to form thermally the self-lubricity layer on the surface of the sold plate body. Those technologies can be selected depending on the properties of the self-lubricity material to be formed.

In reference to the drawings, the embodiments of the present invention will be explained as follows.

Figure 5:
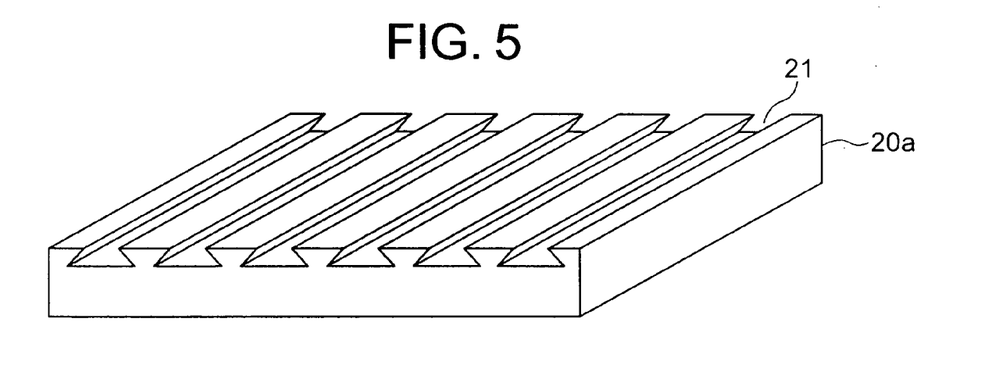
FIG. 5 is a view illustrating the appearance of the sole plate with groom as formed.

FIG. 5 is a view illustrating schematically a structure of grooves 21 formed on the surface of the sole plate body 2a on which the sliding member is to be formed. The multiple grooves 21 can be formed e.g. in parallel on the surface to which the sliding member is in contact, and the width of the grooves 21 is gradually reduced as shown along with the shallowness of the grooves.

Figure 6:
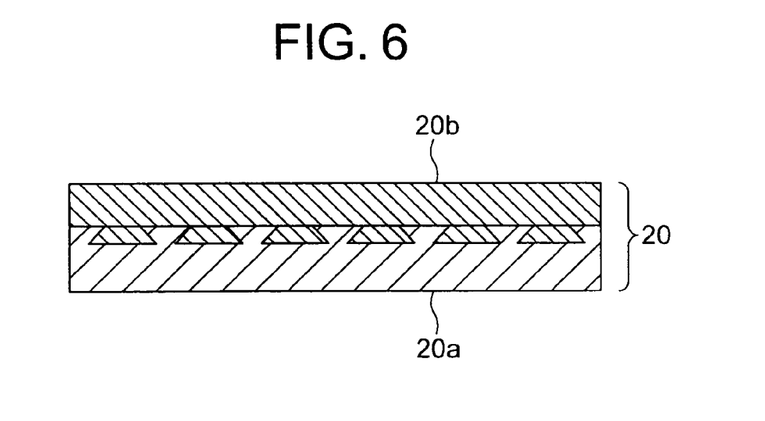
FIG. 6 is a view illustrating schematically the sectional view of the sole plate with the grooms as formed in which a sliding element is mounted.

As shown in FIG. 6, a portion of a sliding material 20b is inlaid in the sole plate body 20a to make the sole plate 20 in use for turbine by applying a melt resin of self-lubricity material to the grooves 21 to form the cover or coating layer of the self-lubricity material on the whole surface of the sole plate body 20a having multiple grooves.

The sole plate 20 is to be smoothly sliding on the gland pad with heavy loading, and therefore, there is easy occurrence of release and dislocation between the sole plate body 20a and the sliding member 20b. Further, the sole plate 20 will be easily heated because it is fixed on the equipment at the high temperature during operation, such as a steam turbine, and therefore, there would be occurred thermal expansion to generate difference between the sole plate body 20a and the sliding member 20b, which will give easy release thereof.

The grooves 21 are formed on the surface of the sole plate body 20a so that they are filled with a portion of the self-lubricity material to form the sliding member 20b of the self-lubricity material and further the wedge effect by the filled self-lubricity material will control or reduce the dislocation and release between the sole plate body 20a and the sliding member 20b.

In accordance with the present invention, in place of the groove formation, a porous layer is formed on the surface of the sole plate body so as to fix surely the sliding member and then further, the sliding member can be formed on the surface of the porous layer. Further, some examples of forming this porous layer on the surface of the sole plate body will be explained as follows.

Firstly, a porous layer made from metal plate (films) will be illustrated as follows.

Figure 7:
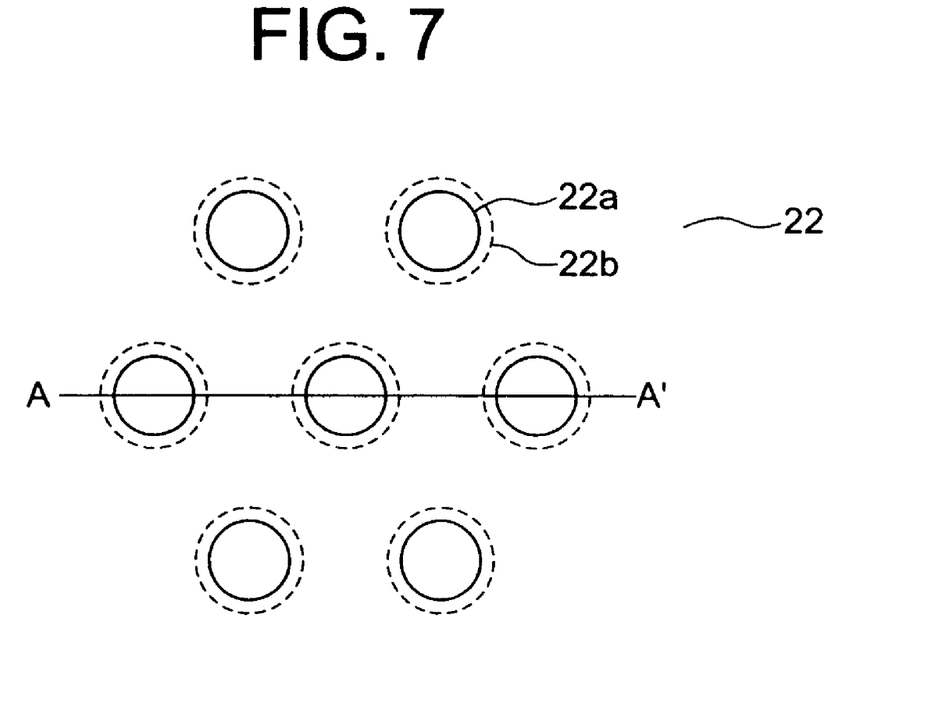
FIG. 7 is a view illustrating schematically the plane view of the surface of the porous layer as formed on the metal plate in accordance with the present invention.

FIG. 7 shows a plane view of a porous layer as formed from metal plates 22 having holes 22a and 22b in triangle pattern having the angle of 60°. On the upper side of the drawing, the sliding member will be formed. The back side of the drawing is the surface to be joined on the sole plate body. The holes 22a shown by a real line are holes formed on the side on which the sliding member is to be formed, and on the other hand, the holes 22b shown by a dotted line are holes formed on the side on which the sole plate body is to be in touch. The former holes of the sliding member side have smaller size in comparison with the holes of the sole plate body side.

Figure 8:
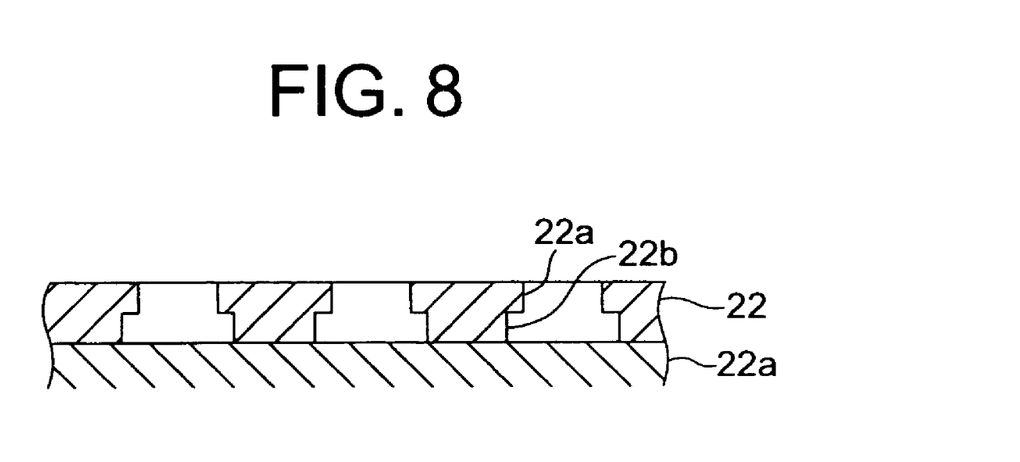
FIG. 8 is a view illustrating schematically in section the sole plate as combined the porous layer as illustrated in FIG. 7, in accordance with the present invention.

FIG. 8 shows a section (along with the line A–A' of FIG. 7) of metal films 22 (porous layer) of FIG. 7, in which all of the holes formed in the porous layer are formed as shown the section gradually being smaller diameter to the surface on which the sliding member is to be formed, and the diameter of those holes being gradually larger along its depth to the surface on which the sole plate body 20a is to be formed. Wherein those holes are filled and cured with at least one part of the resin material with self-lubricity so as to form the sliding member of the self-lubricity material thereon, the wedge effect of the resin filled will prevent the sliding member to release and dislocated.

This porous layer may be formed and worked from one sheet of metal plate. Alternatively, two sheets of metal plates are prepared having holes of the same pattern but the diameter of one is different and larger than that of the other. Such porous layer can be formed from one sheet of metal plate or two or more sheets of metal plates which have different size holes, the diameter of one being larger than that of the another one, and the pattern of the holes being the same so as to correspond the center of the holes each to the other, and manufactured.

Figure 9:
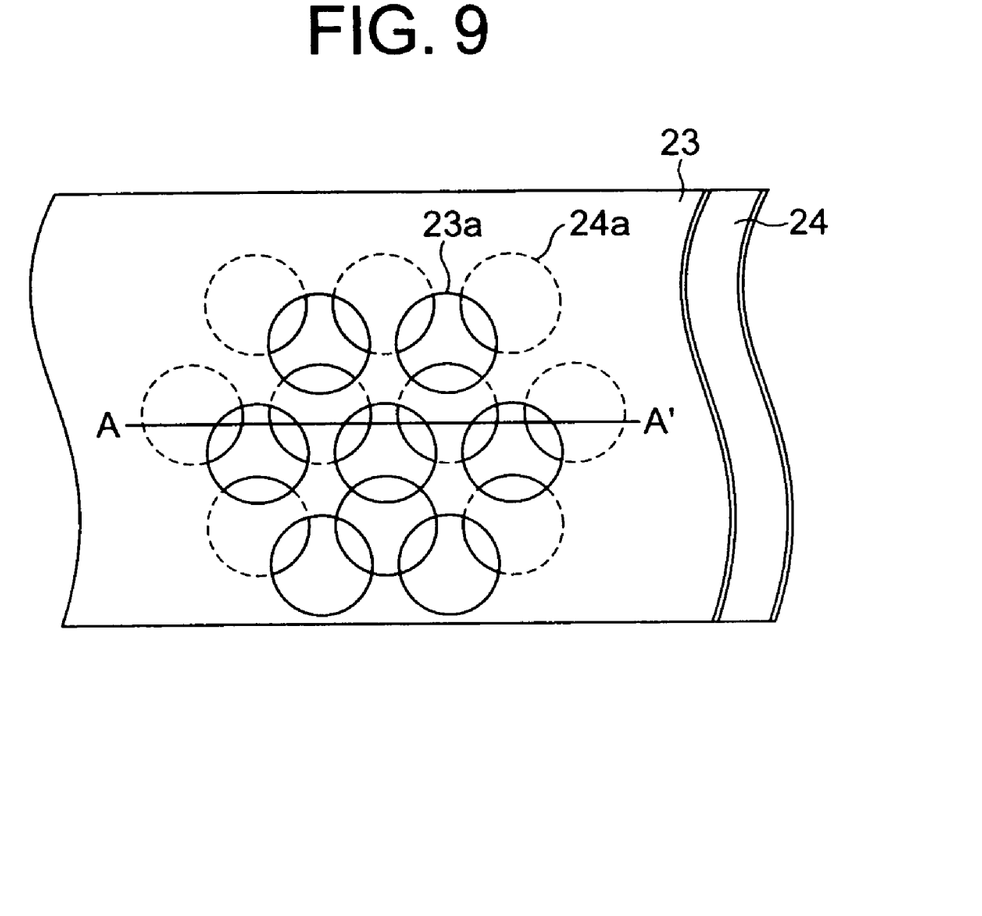
FIG. 9 is a view illustrating schematically another embodiment of the porous layer in which pores are formed in the metal plate, in accordance with the present invention.

The method of manufacturing such porous layer can be done by applying the metal plates as shown in FIG. 7 having a plurality of holes the diameter of which is gradually increasing along the depth thereof, and further alternatively by applying the metal plates 23 and 24 as shown in FIG. 9 having the holes 23a in the metal plate 23, and the other patterned holes 24a in the metal plate 24 in which the center of the holes 23a is positioned at the center of the three holes 24a in triangle pattern.

Figure 10:
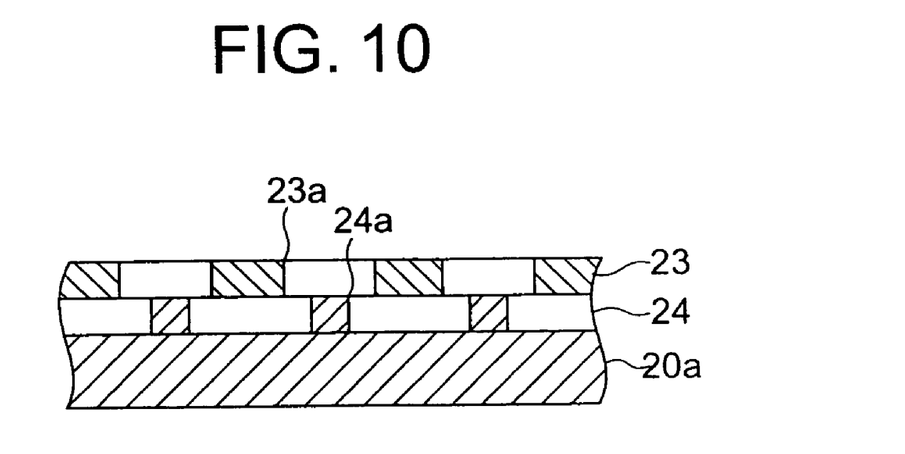
FIG. 10 is a view illustrating schematically the section of the sole plate as combined with the porous layer as illustrated in FIG. 9, in accordance with the present invention.

The section of this layer is as shown in FIG. 10, and the wedge effect will effect in the same way as shown in FIG. 8 so as to prevent the release and the dislocation of the sliding member from the sole plate body 20a.

Further, the porous layer can be formed from wires and spherical member in spite of the above mentioned methods.

Figure 11:
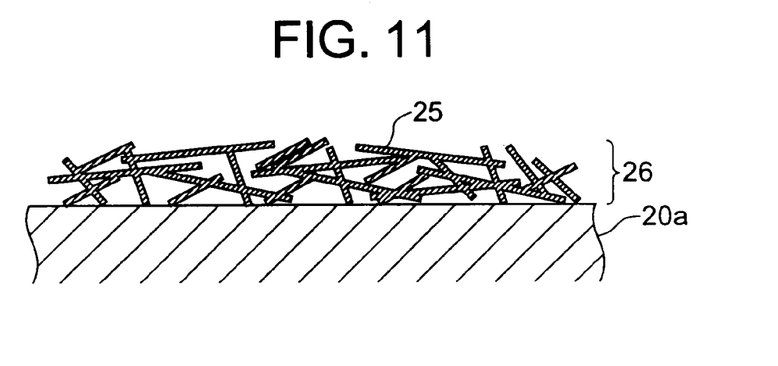
FIG. 11 is a view illustrating schematically a body of the sole plate with porous layer composed of wires, in accordance with the present invention.

FIG. 11 illustrates one example of a porous layer 26 made from metal wires 25 on the surface of the sole plate body 20a on which a sliding member is to be formed. The wires 25 are joined to the sole plate body 20a, and at the same time they are joined each to the other. A space among the wires 25 is formed so that the space can be filled with at least a portion of the self-lubricity material thereby forming the porous layer 26 made of the wires 25 so as to cover with the self-lubricity material on this porous layer. Therefore, the sliding member can be prevented from release and dislocation by the wedges as formed in the porous layer to securely fix the sliding member.

Figure 12:
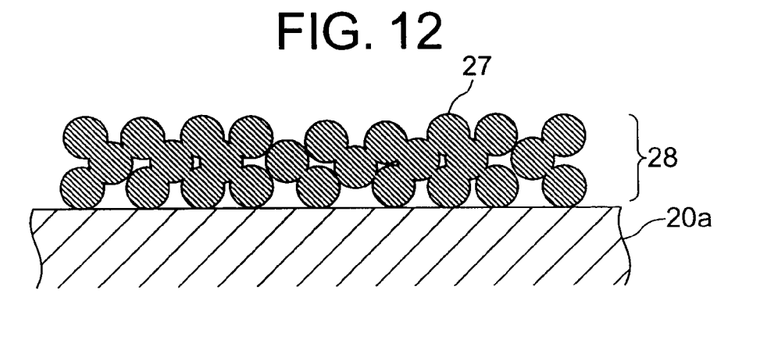
FIG. 12 is a view illustrating schematically another body of the sole plate with porous layer composed of spherical particles in accordance with the present invention.

FIG. 12 illustrates in section one embodiment of the sliding member in which a plurality of metal spherical members 27 are applied to the surface of the sole plate body 20a to form a sliding member of porous layer 28. The metal spherical members 27 are joined to the sole plate body 20a and at the same time joined each the other.

Such regularly or random arrangement of the spherical members can be used, and further, monolayer or multilayered can be used. Therefore, space among the metal spherical members can be formed so that the wedge effect as similar to that of the above mentioned wires porous layer can avoid the release and dislocation of the sliding member and the sole plate body.

There is noted that the above mentioned embodiment of the present invention is illustrated in case of using a resin material for the self-lubricity material, but the other self-lubricity material can be applied to the structure of the sole plate in use for turbine, and the selection and choice of the material and the structure of the sole plate can be appropriately done from variety of the self-lubricity material and structure.

(Power Plant Equipment)

A power plant equipment of the present invention uses as a sole plate for installing a gas turbine and a steam turbine on a base the above-described sole plate in use for a turbine.

The elements consisting of the power plant equipment of the present invention are not limited and the present invention can be applied to any of the conventional power plant equipment. For example, the equipment of the combination of a steam turbine and a generator, a kind of one-shaft combined cycle plant such as a combination of a gas turbine, a steam turbine and a generator.

There is given as a one-shaft combined cycle power plant, a one shaft combined cycle plant as shown in FIG. 1 having a relatively small volume with a steam turbine operated by non-recycle at low temperature steam. In this drawing, a gas turbine 2 directly connected to a compressor 1 is connected to a generator 4 by means of a rigid coupling mechanism 3, in which the generator is connected to the steam turbine 6 by a diaphragm coupling mechanism 5. Further, a thrust bearing 7 is provided outside of the compressor 1 and the steam turbine 6. Then, the sole plate of the present invention is used to connect the compressor 1 and the steam turbine 6 on a base.

There has been proposed a big volume one-shaft combined cycle power plant as shown in FIG. 2, which has a big volume of the gas turbine and the steam turbine, and recycling of heat to raise the temperature so as to improve the energy efficient.

With a big volume one-shaft combined cycle plant as shown in FIG. 2, a gas turbine 2, a steam turbine 6 and a generator 4 are coupled by means of a rigid coupling mechanism. Therefore, the thermal expansion of the shaft can be absorbed and then the thrust bearing 7 is mounted at one position of the shaft of the compressor 1 for gas turbine. Then, in order to minimize the difference occurred at the blocking portion and the rotating portion of the steam turbine, the steam turbine 6 is positioned between the gas turbine compressor 1 near the thrust bearing 7 and the generator 4. The sole plate of the present invention is used as a sole plate to fix the compressor 1 and the steam turbine 6 on the base.

FIG. 3 illustrates a sectional view of one example of the big volume one-shaft combined cycle plant as shown in FIG. 2. The steam turbine is divided into three turbines, a high pressure turbine, a medium pressure turbine and a low pressure turbine, and an exhaust from the medium pressure turbine is connected by means of a tube connector. This steam turbine is in a large size using a low pressure turbine.

The sole plate of the present invention can be applied to a bearing base (support) 11 positioned both sides of the stream turbine, and further to the space between a bearing base (support) 11 positioned between the medium pressure turbine and the low pressure turbine and a gland pad 10 fixed on the base 9.

The sole plate of the present invention does not need to be applied to all of the mounting portions of all turbine. For example, there may be only one application of the inventive sole plate to the mounting portion of the bearing base of the high pressure turbine on the base, and the other mounting portion uses the prior art sole plate. In the power plant equipment of the present invention, the inventive sole plate can be selectively used or applied to an appropriate mounting portion thereof.

It is especially useful to apply the sole plate of the present invention in one shaft combined cycle power plan, preferably to a big volume one shaft combined cycle power plant. The big volume one shaft combined cycle power plant uses a rigid coupling mechanism to connect a compressor, a gas turbine, a generator, a steam turbine to a rotating shaft which is much long, and therefore, even slight shift of the alignment would occur severe vibration and noise. Further, the big volume one shaft combined cycle power plant has a big weight of the rotating shaft, and therefore, the vibration and noise occurred could affect more. Then, by application of the sole plate of the present invention to such plant, the change of the alignment can be effectively controlled or suppressed so as to reduce the vibration and noise.

Figure 13:
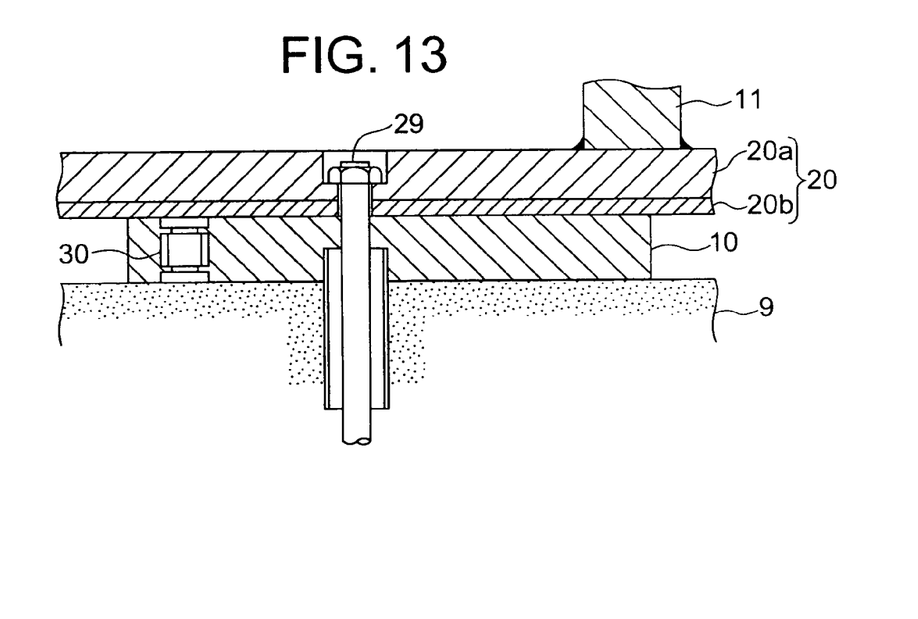
FIG. 13 is a view illustrating schematically in section the structure of the mounting portion of the sole plate, positioned on a power generating equipment.

FIG. 13 illustrates one example of a mounting portion of the power plant equipment of the present invention. A gland pad 10 is fixed on a base 9 comprising a concrete block. The sole plate 20 of the present invention is slidablly mounted on the gland pad 10, and a bearing base (support) 11 of a steam turbine is fixed on this sole plate of the present invention.

A sole plate 20 comprises a sole plate body 20a and a sliding member 20b, in which a sliding member 20b is positioned on the side of the gland pad 10, and the sole plate body 20a is positioned on the side of the bearing base 11 of the steam turbine.

A gland pad 10 and a sole plate 20 are fixed on a base 9 by means of a base bolt 29 so that they can slide each on the other. The position of the sole plate 20 is adjusted by the gland pad 10 and an adjusting screw thread 30.

The power plant equipment of the present invention can use a variety of a turbine sole plate of the present invention, other than the combination of a plane sliding member and a sole plate body, which may include the formation of a sliding member on the sole plate body having grooves as shown in FIG. 6, a sliding member of porous layer made from multiple (two) metal films having small holes as shown in FIG. 10, a porous layer made from wires or metal spheres as shown in FIGS. 11 and 12.

The power plant equipment of the present invention uses a sole plate of the present invention which supports the turbine on the base, so that the shift of the alignment of the shaft due to the reaction against the thermal expansion, and the thrust of the gas turbine can be controlled so as to reduce generation of noise and vibration, and thereby to reduce the cost of periodical maintenance such as adding a lubricant oil thereby eliminating the maintenance cost and management cost.

EXAMPLES

The present invention will be further explained by the following examples.

Example 1

A sole plate body with grooves on its surface is used as a sole plate body. The sole plate body comprises steel AISI 1045 and has the thickness of 100 mm, width of 400 mm and length of 800 mm and further V-type grooves having the depth of 2 mm, width of 4 mm and length of 400 mm.

This sole plate body is inserted in a moulding, and then the moulding is filled with powder of ethylene tetrafluoride resin containing 10 wt % of carbon fiber material, which is pressed with pressure of 49 MPa (500 kgf/cm$^2$) to form a moulding with the powder material filling the V-type grooves of the sole plate body enough, giving the resin layer having thickness of 2 mm on the surface of the sole plate body.

Then, the sole plate body with resin layer is heated at the temperature of 400° C. for 2 hours to melt the ethylene tetrafluoride resin, giving a sole plate for turbine having ethylene tetrafluoride resin composite layer of 2 mm in thickness containing carbon fiber material.

In reference with FIG. 13, a gland pad 10 and a sole plate for turbine are positioned on a base 9 comprising concrete material, and further a bearing base 11 for a steam turbine is mounted thereon. The sole plate 20 is positioned so that the sole plate-body 20a is on the bearing base 11 of steam turbine, and the sliding member 20b is on the gland pad 10.

A sole plate 20 and a gland pad 10 are fixed on a base 9 by a base bolt 29 mounted on a base concrete 9. The position of the sole plate 20 is adjusted by a gland pad 10 and an adjusting screw thread 30.

The power plant equipment of the present invention does not need any lubricant oil because the sole plate has a sliding member comprising a self-lubricity ethylene tetrafluoride resin composite having very low friction coefficient, and further which enables to smoothly move by the reaction against thermal expansion and the other thrust by a gas turbine and the like.

Example 2

A sole plate body comprising steel AISI 4130 and having the thickness of 100 mm, width of 400 mm and length of 800 mm is used for the sole plate body in accordance with the present invention.

Two punching metal plates one of which has the thickness of 1 mm, and hole size of 3 mm and pitch of 5 mm and the other of which has the thickness of 1 mm, and hole size of 4 mm and pitch of 5 mm are layered mutually with each hole being positioned at the each other plate hole, and the two layered plates are put on the surface of the sole plate body, and treated in vacuum to spattering joint, giving the sole plate body with porous layer on the surface thereof.

The sole plate body is inserted into a moulding, and then the moulding is filled with powder of polyimide resin containing 10 wt % of glass fiber material and 10 wt % of ethylene tetrafluoride resin, which is pressed with pressure of 49 MPa (500 kgf/cm$^2$) to form a moulding with integrating the powder material into the porous layer as formed on the surface of the sole plate body, giving the resin layer having thickness of 2 mm on the surface of the sole plate body.

Then, the sole plate body with resin layer is heated at the temperature of 400° C. for 2 hours to melt the ethylene tetrafluoride resin, giving a sole plate for turbine having ethylene tetrafluoride resin composite layer of 2 mm in thickness containing carbon fiber material.

In reference with FIG. 13, a gland pad 10 and a sole plate for turbine are positioned on a base 9 comprising concrete material, and further a bearing base 11 for a steam turbine is mounted thereon. The sole plate 20 is positioned so that the sole plate body 20a is mounted on the bearing base 11 for the steam turbine, and the sliding member 20b is on the gland pad 10.

A sole plate 20 and a gland pad 10 are fixed on a base 9 by a base bolt 29 mounted on a base concrete 9. The position of a sole plate 20 in use for turbine is adjusted by a gland pad 10 and an adjusting screw thread.

The power plant equipment of the present invention does not need any lubricant oil because the sole plate has a sliding member comprising a self-lubricity ethylene tetrafluoride resin composite having very low friction coefficient, and further which enables to smoothly move by the reaction against thermal expansion and the other thrust by a gas turbine and the like.

INDUSTRIAL APPLICABILITY

The sole plate in use for turbine in accordance with the present invention can enable to smoothly slide on a gland pad used in the mounting range of the power plant, and therefore, the change of the alignment of a rotating shaft by a reaction due to thermal expansion and the thrust of a gas turbine can be effectively controlled, and further, a regular maintenance such as filling a lubricating oil can be minimized because its self-lubricity material.

The power plant equipment in accordance with the present invention can control the vibration of the power plant equipment itself and further limits noise emission, and then, can reduce the cost of maintenance and maintenance frequency.

What is claimed is:

1. A sole plate in use for turbine to be positioned between a gland pad installed on a base and a turbine support, comprising:

a sole plate body made of a metal material disposed on the turbine support side; and a sliding member made of a material with self-lubricity formed on the surface of the sole plate body on the gland pad side, wherein the compression elastic deformation (Δt) of said material with self-lubricity is less than 0.1;

wherein $\Delta t = \epsilon \times t$, and $\epsilon = \sigma / E$ wherein

Δt: compression elastic deformation (mm),
t: thickness of the sliding member (mm),
ε: strain,
σ: loaded pressure (MPa), and
E: compression elastic modulus of said material with self-lubricity.

2. The sole plate in use for turbine as set forth in claim 1, wherein said material with self-lubricity has a friction coefficient between the sliding member and the gland pad of less than 0.30.

3. The sole plate in use for turbine as set forth in claim 1, wherein said material with self-lubricity is an organic material, an inorganic material, or a combination thereof.

4. The sole plate in use for turbine as set forth in claim 3, wherein said organic material comprises one species selected from a low friction coefficient resin material made of ethylene tetrafluoride, ethylene tetrafluoride perfluoro alkoxy ethylene, polyether ketone or polyimido and the mixture of such low friction coefficient resin material.

5. The sole plate in use for turbine as set forth in claim 3, wherein said inorganic material comprises at least one species selected from a group consisting of carbon, graphite, $MoS_2$, BN, SiC, TiC, AlN and TiN.

6. The sole plate in use for turbine as set forth in claim 3, wherein said inorganic material comprises metal material selected from copper or copper alloy.

7. The sole plate in use for turbine as set forth in claim 1, wherein the pressure elastic modulus (E) of the self-lubricity material is more than 500 MPa.

8. The sole plate in use for turbine as set forth in claim 1, wherein said material having self-lubricity contains a reinforcing filler material.

9. The sole plate in use for turbine as set forth in claim 8, wherein the content of the reinforcing filler material in the material having self-lubricity ranges from 5 wt % to 50 wt %.

10. The sole plate in use for turbine as set forth in claim 8, wherein said reinforcing filler material comprises at least one species selected from the group consisting of a glass fiber material, a carbon fiber material, a graphite material, a ceramic fiber material, or particulate material thereof.

11. The sole plate in use for turbine as set forth in claim 1, wherein a porous layer is formed on a surface of the gland pad of the sole plate body, and said material having self-lubricity is applied on the surface of said porous layer and then at least one part of said material having self-lubricity is filled within said porous layer.

12. A power generating plant equipment having a gland pad installed on a base and a turbine mounted on said gland pad by means of a sole plate positioned on the gland pad, wherein the sole plate is as set forth in claim 1.

* * * * *